(12) United States Patent
Zeller et al.

(10) Patent No.: US 10,752,157 B1
(45) Date of Patent: Aug. 25, 2020

(54) COMPACT PAYLOAD STOPPER FOR MOBILE ROBOT COMPRISING CONVEYOR

(71) Applicant: Fetch Robotics, Inc., San Jose, CA (US)

(72) Inventors: Andrew John Zeller, San Jose, CA (US); Eric Diehr, San Jose, CA (US); Michael Janov, Cupertino, CA (US); Paelle Powell, Cupertino, CA (US)

(73) Assignee: Fetch Robotics, Inc., San Jose, CA (US)

( * ) Notice: Subject to any disclaimer, the term of this patent is extended or adjusted under 35 U.S.C. 154(b) by 31 days.

(21) Appl. No.: 16/355,487

(22) Filed: Mar. 15, 2019

(51) Int. Cl.
| | | |
|---|---|---|
| *B60P 7/16* | (2006.01) |
| *B60P 1/52* | (2006.01) |
| *B65G 67/24* | (2006.01) |
| *B65G 47/61* | (2006.01) |
| *B25J 9/16* | (2006.01) |

(52) U.S. Cl.
CPC ........ *B60P 7/16* (2013.01); *B60P 1/52* (2013.01); *B65G 47/61* (2013.01); *B65G 67/24* (2013.01); *B25J 9/162* (2013.01)

(58) Field of Classification Search
CPC ........ B65G 67/04; B65G 67/24; B65G 47/61; B60R 1/64; B60P 3/007; B60P 7/16; B60P 1/52; B25J 9/162; B25J 9/1661; B25J 9/1633; B25J 9/0093; G05D 1/0088; G05D 1/0282; Y10S 901/01
USPC .............. 198/345.1, 345.2, 345.3; 193/35 A; 414/351, 353, 395, 398, 400, 279, 280
See application file for complete search history.

(56) References Cited

U.S. PATENT DOCUMENTS

| | | | | |
|---|---|---|---|---|
| 5,109,971 A * | 5/1992 | Riner | ............... | B65G 69/24 |
| | | | | 193/35 A |
| 5,211,276 A * | 5/1993 | Clopton | ............. | B65G 47/8823 |
| | | | | 193/35 A |
| 6,543,983 B1 * | 4/2003 | Felder | ............... | B23Q 7/10 |
| | | | | 414/331.07 |
| 7,975,825 B2 * | 7/2011 | Lindemann | ........ | B65G 47/8823 |
| | | | | 193/35 A |
| 9,827,683 B1 * | 11/2017 | Hance | ............... | G06Q 10/0875 |
| 10,048,697 B1 * | 8/2018 | Theobald | ............... | B25J 5/00 |
| 2007/0170035 A1 * | 7/2007 | Robinson | ........... | B65G 47/8823 |
| | | | | 193/35 A |
| 2007/0175729 A1 * | 8/2007 | Robinson | ........... | B65G 47/8823 |
| | | | | 193/35 A |

(Continued)

*Primary Examiner* — James R Bidwell
(74) *Attorney, Agent, or Firm* — J. Steven Svoboda

(57) ABSTRACT

A compact payload stopper includes: an interface assembly that serves as a main structural member of the payload stopper, the payload stopper configured to stop the payload from moving off a mobile robot; a stopper blade assembly connected to the interface assembly so as to allow the stopper blade assembly to pivot about an axis of the interface assembly, the stopper blade assembly configured to have a disengaged position that allows for a payload to be moved onto or off the robot, the stopper blade assembly further configured to have an engaged position that stops the payload from moving off the robot; and a motor assembly comprising a motor, the motor assembly connected to the interface assembly, the motor assembly configured to apply a force to the stopper blade assembly, causing the stopper blade assembly to rotate into a desired position of the engaged position and the disengaged position.

35 Claims, 12 Drawing Sheets

(56) References Cited

U.S. PATENT DOCUMENTS

| | | | |
|---|---|---|---|
| 2010/0089720 A1* | 4/2010 | Matsuura | B23K 3/08 198/345.3 |
| 2014/0204510 A1* | 7/2014 | Ireland | A47L 9/2873 361/679.01 |
| 2016/0349749 A1* | 12/2016 | Gariepy | G05D 1/0223 |

* cited by examiner

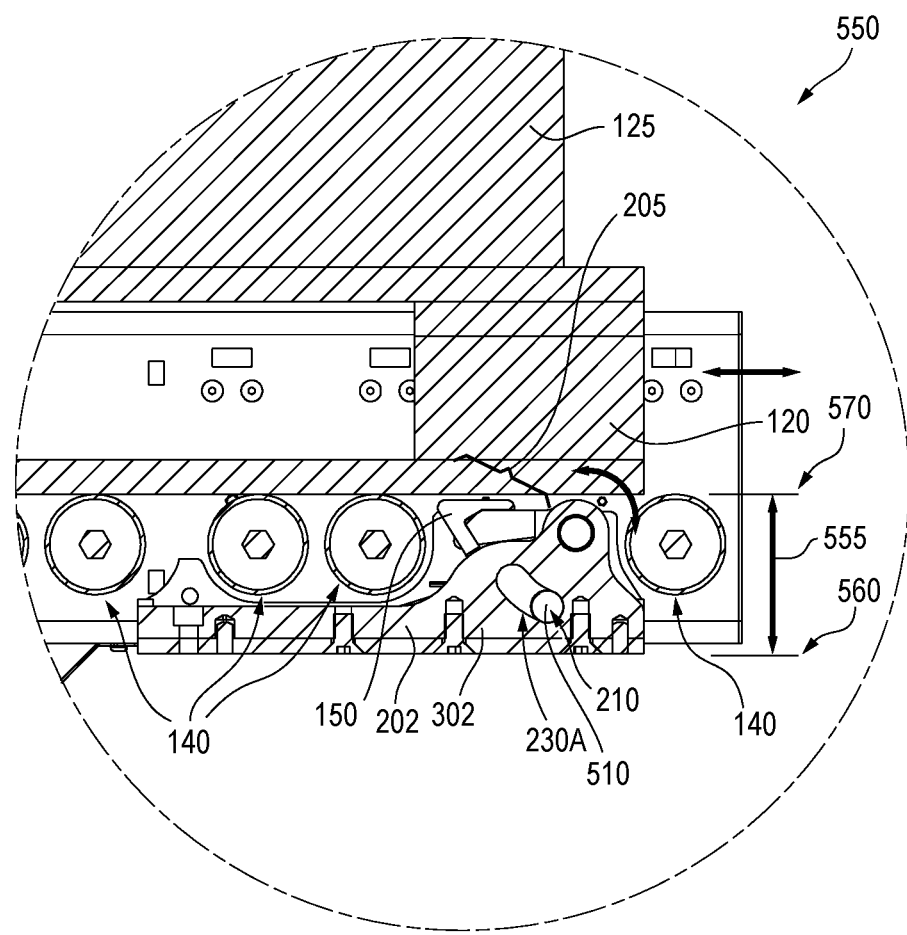

COMPACT PAYLOAD STOPPER FOR MOBILE ROBOT COMPRISING CONVEYOR

SUMMARY

Embodiments of the invention relate in general to a payload stopper for a mobile robot. More specifically, embodiments of the invention relate to a compact payload stopper for a mobile robot. Even more specifically, embodiments of the invention relate to a payload stopper on a mobile robot. Even more specifically, embodiments of the invention relate to a compact payload stopper for a conveyor on an autonomous mobile robot.

A compact payload stopper configured to stop a payload from moving from a position on a conveyor on a mobile robot includes: an interface assembly that serves as a main structural member of the payload stopper, the interface assembly attaching the payload stopper to the mobile robot, the payload stopper configured to stop the payload from moving off the mobile robot; a stopper blade assembly connected to the interface assembly so as to allow the stopper blade assembly to pivot about an axis of the interface assembly, the stopper blade assembly comprising a stopper blade configured to regulate movement of the payload, the stopper blade assembly configured to have a disengaged position that allows for one or more of moving a payload onto the robot and moving a payload off the robot, the stopper blade assembly further configured to have an engaged position that stops the payload from moving off the robot; and a motor assembly comprising a motor, the motor assembly connected to the interface assembly, the motor assembly configured to apply a force to the stopper blade assembly, causing the stopper blade assembly to rotate into a desired position of the engaged position and the disengaged position.

A compact payload stopper configured to stop a payload from moving from a position on a conveyor on a mobile robot, includes: an interface assembly that serves as a main structural member of the payload stopper, the interface assembly attaching the payload stopper to the mobile robot, the payload stopper configured to stop the payload from moving off the mobile robot; a stopper blade assembly connected to the interface assembly so as to allow the stopper blade assembly to pivot about an axis of the interface assembly, the stopper blade assembly configured to have a disengaged position that allows for one or more of moving a payload onto the robot and moving a payload off the robot, the stopper blade assembly further configured to have an engaged position that stops the payload from moving off the robot, the stopper blade assembly further comprising a plurality of stopper shoulder screws configured to fasten the stopper blade assembly through a plurality of slots in the interface assembly, the stopper shoulder screws configured to resist rotation of the stopper blade assembly when the payload impacts the stopper blade; a linkage configured to actuate the stopper blade assembly between the engaged position and the disengaged position by converting rotational output of the motor into rotation of the stopper blade assembly; and a motor assembly comprising a motor, the motor assembly connected to the interface assembly, the motor assembly configured to apply a force through the linkage to the stopper blade assembly, causing the stopper blade assembly to rotate into a desired position of the engaged position and the disengaged position.

A compact payload stopper configured to stop a payload from moving from a position on a conveyor on a mobile robot includes: an interface assembly that serves as a main structural member of the payload stopper, the interface assembly attaching the payload stopper to the mobile robot, the payload stopper configured to stop the payload from moving off the mobile robot; a stopper blade assembly connected to the interface assembly so as to allow the stopper blade assembly to pivot about an axis of the interface assembly, the stopper blade assembly configured to have a disengaged position that allows for one or more of moving a payload onto the robot and moving a payload off the robot, wherein the disengaged position folds the stopper blade assembly down beneath the height of the conveyor, the stopper blade assembly further configured to have an engaged position that stops the payload from moving off the robot, wherein the payload stopper is configured to provide feedback when the payload stopper is in the engaged position that it is safe for the robot to move, wherein the payload stopper is further configured to provide feedback when it is in the disengaged position that it is not safe to move; a linkage configured to actuate the stopper blade assembly between the engaged position and the disengaged position by converting rotational output of the motor into rotation of the stopper blade assembly; and a motor assembly comprising a motor, the motor assembly connected to the interface assembly, the motor assembly configured to apply a force through the linkage to the stopper blade assembly, causing the stopper blade assembly to rotate into a desired position of the engaged position and the disengaged position, wherein the payload stopper is installed on one or more of a front side and a back side of the robot.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIG. 5B is a cross-section detail view showing a stopper blade assembly of a payload stopper in a disengaged position to allow the payload to move.

DETAILED DESCRIPTION

Figure 1A:
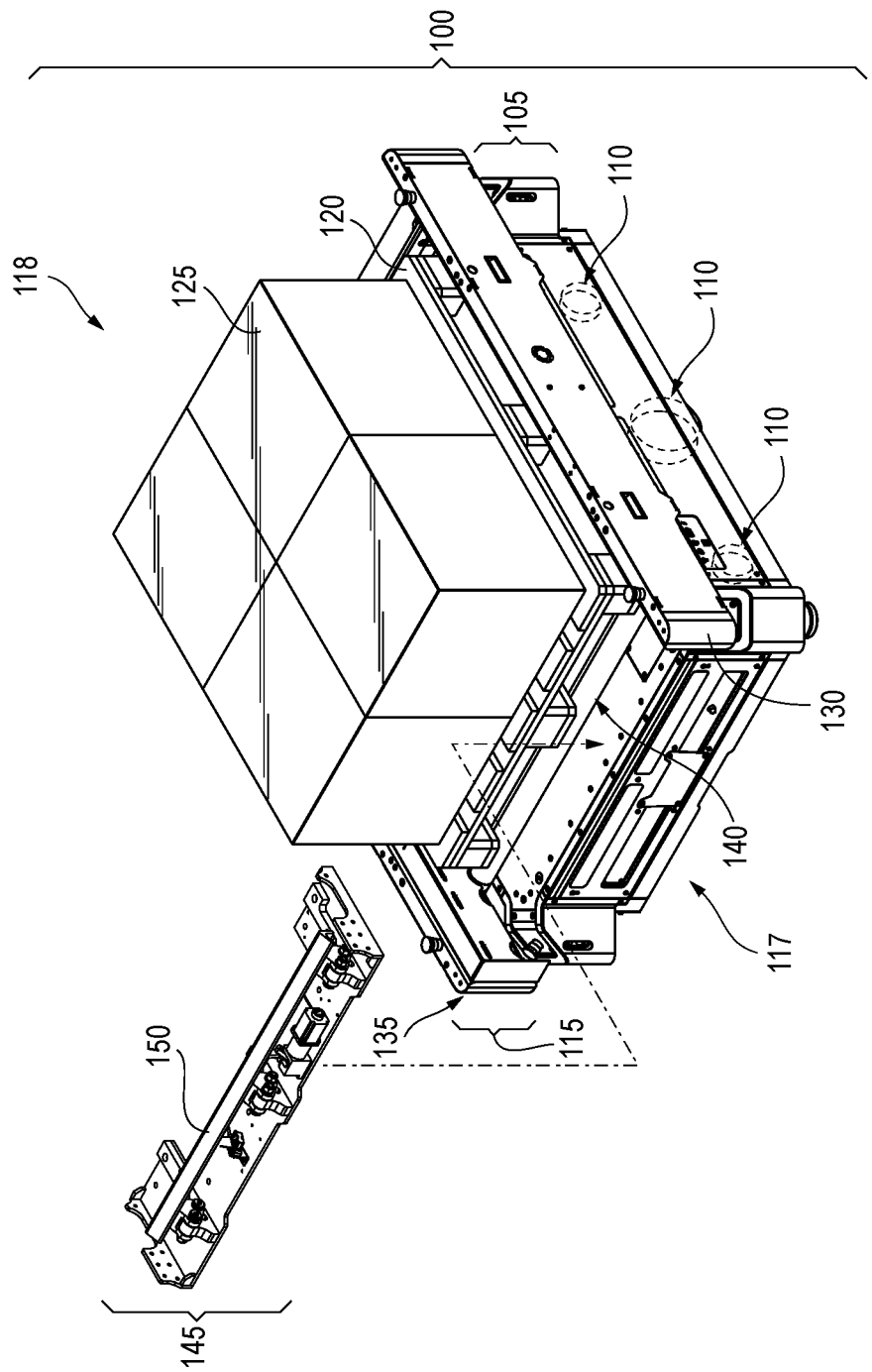
FIG. 1A is an exploded drawing in perspective view of a payload transport system for a mobile robot comprising a payload stopper.
Figure 1B:
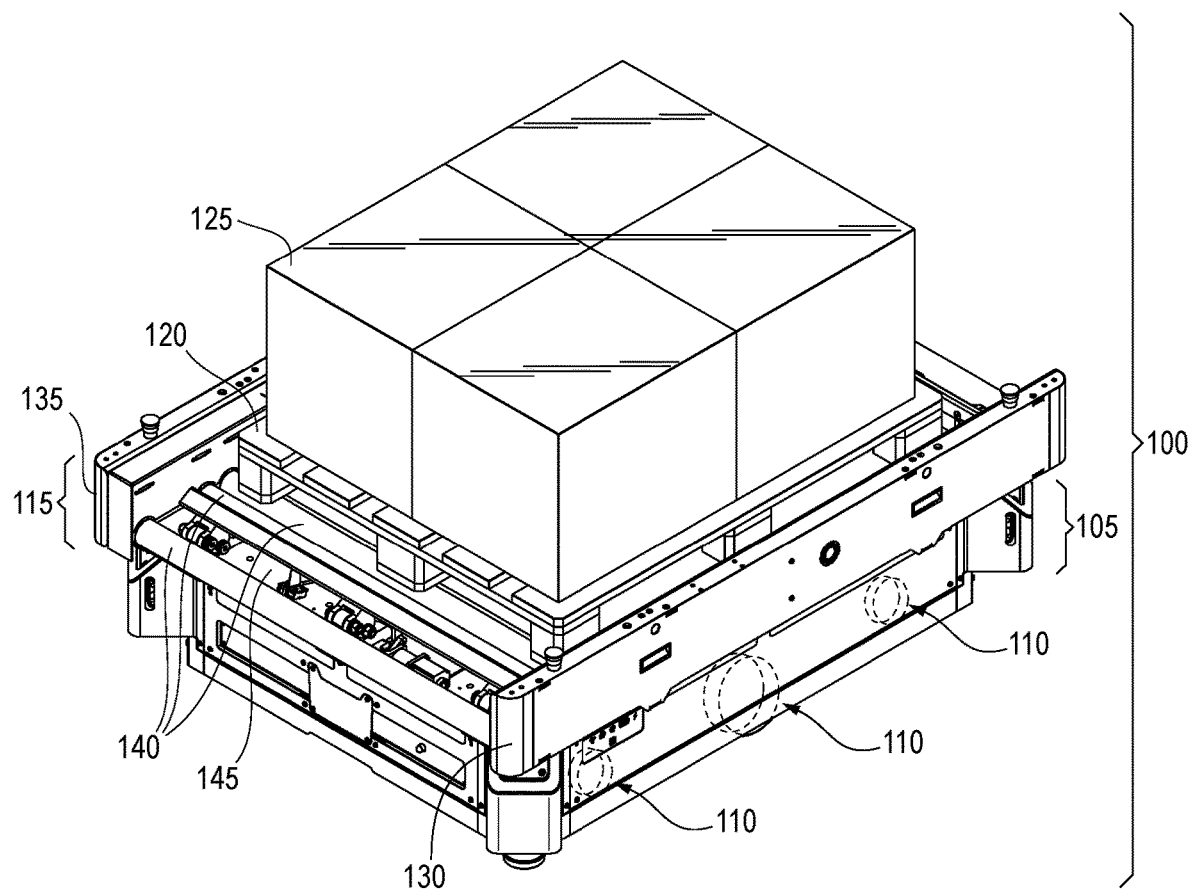
FIG. 1B is a drawing in perspective view of a fully assembled payload transport system for a mobile robot comprising a payload stopper.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

This invention relates to the transport of a payload by mobile robots in an industrial setting, and entails industrial control and automation, industrial safety, industrial conveyor systems. "Conveyor" as it is referred to in this context includes but is not limited to one or more of a roller style conveyor system and a belt conveyor system. Preferably, although not necessarily, the conveyor comprises a roller style conveyor system.

The payload stopper for a mobile robot comprises a stopper blade assembly, the stopper blade assembly configured to have a disengaged position that allows for a payload to be transported from the accessory onto other equipment without interference, the stopper blade assembly further configured to have an engaged position that stops the payload from moving off the robot.

The stopper blade assembly rotates up when the mobile robot is navigating so as to contact the payload and hold it in place when the mobile robot is braking. Conversely, the stopper blade assembly folds down beneath the height of the conveyor during one or more of moving a payload onto the robot and moving a payload off the robot. The payload stopper also comprises components configured to actuate its structure. The payload stopper further includes components configured to sense a position of the payload stopper, providing positional feedback to one or more of safety system of the mobile robot and electronics that control actuation of a stopper blade assembly.

A payload stopper is installed on one or more of a front side and a back side of the robot relative to a conveyor onto which the payload is being moved. When engaged, the payload stopper is configured to do one or more of stop unloading of a payload by the conveyor and stop the payload from falling off of the moving robot.

The payload stopper for a mobile robot is configured to stop a payload from moving from a position on a conveyor on top of a mobile robot. The payload stopper for a mobile robot is further configured to enable the autonomous mobile robot to maintain control of the payload while the robot does one or more of slow down and stop. The payload stopper for a mobile robot is further configured to enable the autonomous mobile robot to maintain control of the payload upon braking.

FIG. 1A is an exploded drawing in perspective view of a payload transport system comprising a payload stopper for a mobile robot.

A payload transport system 100 comprises a mobile robot 105. For example, the mobile robot 105 comprises a Freight1500 mobile robot, manufactured by Fetch Robotics of San Jose, Calif. (www.fetchrobotics.com). For example, the mobile robot 105 comprises a Freight500 mobile robot, manufactured by Fetch Robotics of San Jose, Calif. (www.fetchrobotics.com). For example, the mobile robot 105 comprises one or more wheels 110. For example, as depicted, the mobile robot 105 comprises six wheels 110. (Three of the six wheels 110 are omitted from the figure because they are hidden from view.) For example, the mobile robot 105 comprises mobility hardware other than wheels (not shown).

The payload transport system 100 further comprises a conveyor 115 that is attached to the mobile robot 105. Typically, the conveyor 115 is physically attached to the mobile robot 105. Typically, and as depicted, the conveyor 115 sits on top of the mobile robot 105. The conveyor 115 comprises a pallet 120. The pallet 120 comprises a payload 125. For example, the payload 125 comprises one or more items obtained to fulfill an order by a customer. For example, the payload 125 comprises one or more items received from a supplier. For example, the payload 125 comprises one or more items returned by a customer.

The conveyor 115 further comprises one or more of a left frame member 130 and a right frame member 135. As illustrated, the conveyor 115 comprises both the left frame member 130 and the right frame member 135. The conveyor 115 further comprises a plurality of rollers 140. The rollers 140 are mounted to one or more of the left frame member 130 and the right frame member 135. Preferably, but not necessarily, the plurality of rollers 140 are mounted to both the left frame member 130 and the right frame member 135. Preferably, but not necessarily, the rollers 140 span between the left frame member 130 and the right frame member 135. One or more of the left frame member 130 and the right frame member 135 serve as structural supports for the rollers 140. The rollers 140 work together to support one or more of the pallet 120 and the payload 125. When desired, when the payload transport system 100 is stationary, the conveyor 115 can cause the payload 125 to be one or more of unloaded off the pallet 120 and loaded onto the pallet 120. For example, the conveyor 115 can cause the payload 125 to be unloaded off the pallet 120 in a controlled unloading operation. Typically, although not necessarily, the conveyor 115 does this (causing of the payload 125 to be one or more of unloaded and loaded) using the rollers 140. The rollers 140 are powered to spin, thereby causing the payload 125 to be one or more of unloaded from the robot 105 in a controlled unloading operation and loaded onto the robot 105. For example, the payload is one or more of unloaded off the pallet 120 in a controlled unloading operation and loaded onto the pallet 120. For example, a pallet 120 sitting on the robot 105 is unloaded when the rollers 140 spin. Alternatively, a pallet 120 sitting on an adjacent stationary conveyor is loaded onto the robot 105 when the rollers 140 spin.

As depicted, the payload 125 sits on top of the pallet 120. When the mobile robot 105 moves, the conveyor 115 moves, and thus the pallet 120 moves and thus the payload 125 moves.

The conveyor 115 further comprises a payload stopper 145 configured to stop the pallet 120 from moving off the conveyor 115, thereby preventing the payload 125 from moving off the conveyor 115. The payload stopper is installed on one or more of a front side 117 and a back side 118 of the robot 105.

The payload stopper 145 comprises a stopper blade 150 that runs along the width of the rollers (not shown in this figure). The stopper blade 150 regulates movement of the payload 125.

Figure 2:
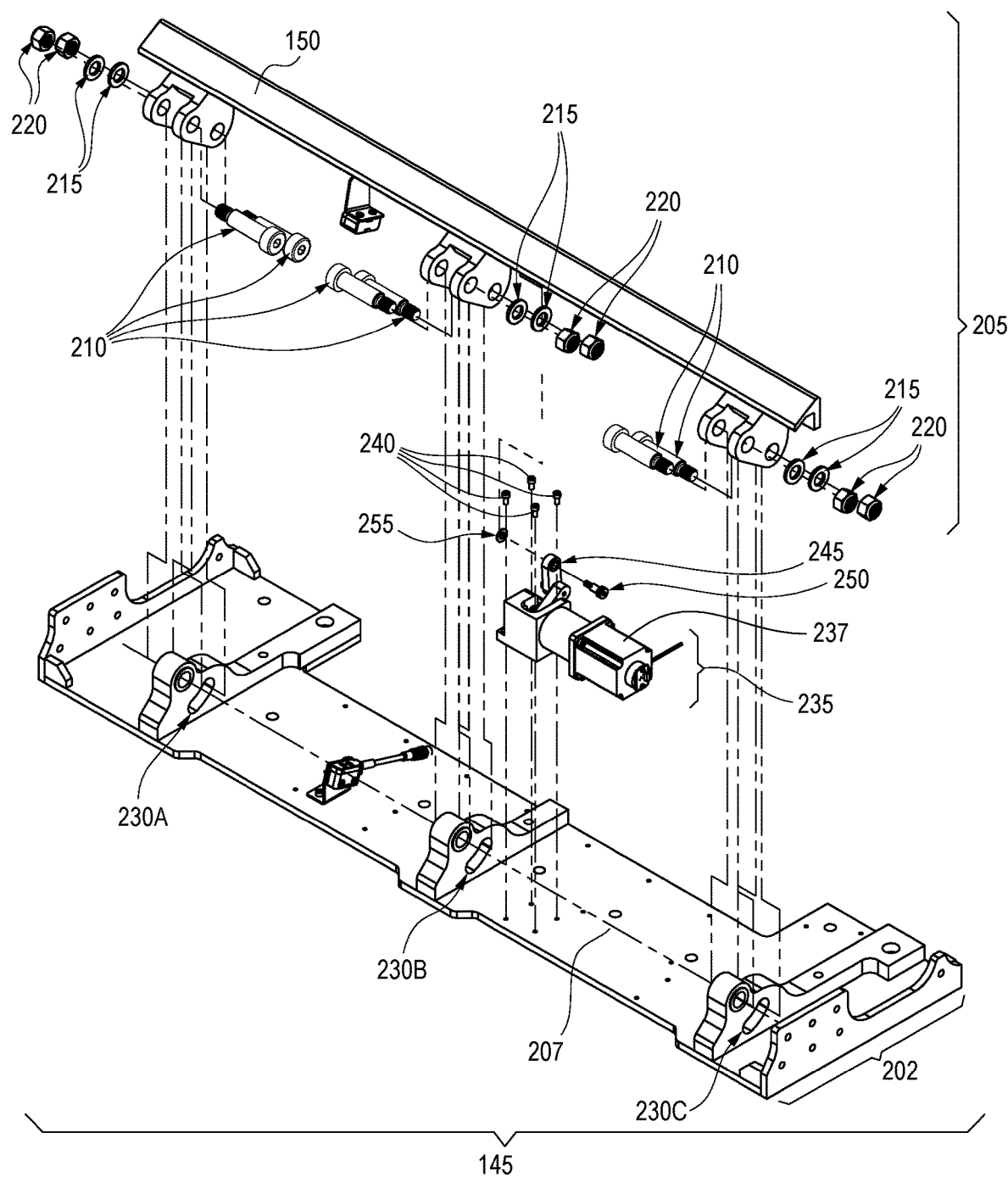
FIG. 2 is an exploded view depicting principal components of a payload stopper for a mobile robot.

FIG. 2 is an exploded drawing depicting principal components of a payload stopper 145 for a mobile robot (not shown in this figure). The payload stopper 145 comprises an interface assembly 202 that serves as a main structural member of the payload stopper 145. The payload stopper 145 further comprises a stopper blade assembly 205. The stopper blade assembly 205 is free to pivot about an axis 207. The stopper blade assembly 205 is fastened to the interface assembly 202 using one or more of stopper shoulder screws 210, stopper washers 215, and stopper lock-nuts 220. The three stopper shoulder screws 210 fasten the stopper blade assembly 205 through three slots 230A, 230B, and 230C in the interface assembly 202. The stopper shoulder screws 210 are configured to resist rotation of the stopper blade assembly 205 when the payload 120 impacts the stopper edge A motor assembly 235 comprises a motor 237. The motor assembly 235 mounts to the interface assembly 202 using motor assembly fasteners 240. A linkage 245 connects to the stopper blade assembly 205 using a linkage shoulder screw 250 and using a washer 255. For example, the linkage 245 comprises a mechanical linkage 245. Using the linkage 245, the motor assembly 235 rotates and applies a force to the stopper blade assembly 205, causing it to rotate about the pivot axis 207 into a desired position, the desired position comprising one of an engaged position (not shown in this figure, visible in FIGS. 5A-5B) and a disengaged position (not shown in this figure, visible in FIGS. 5A-5B).

Figure 3A:
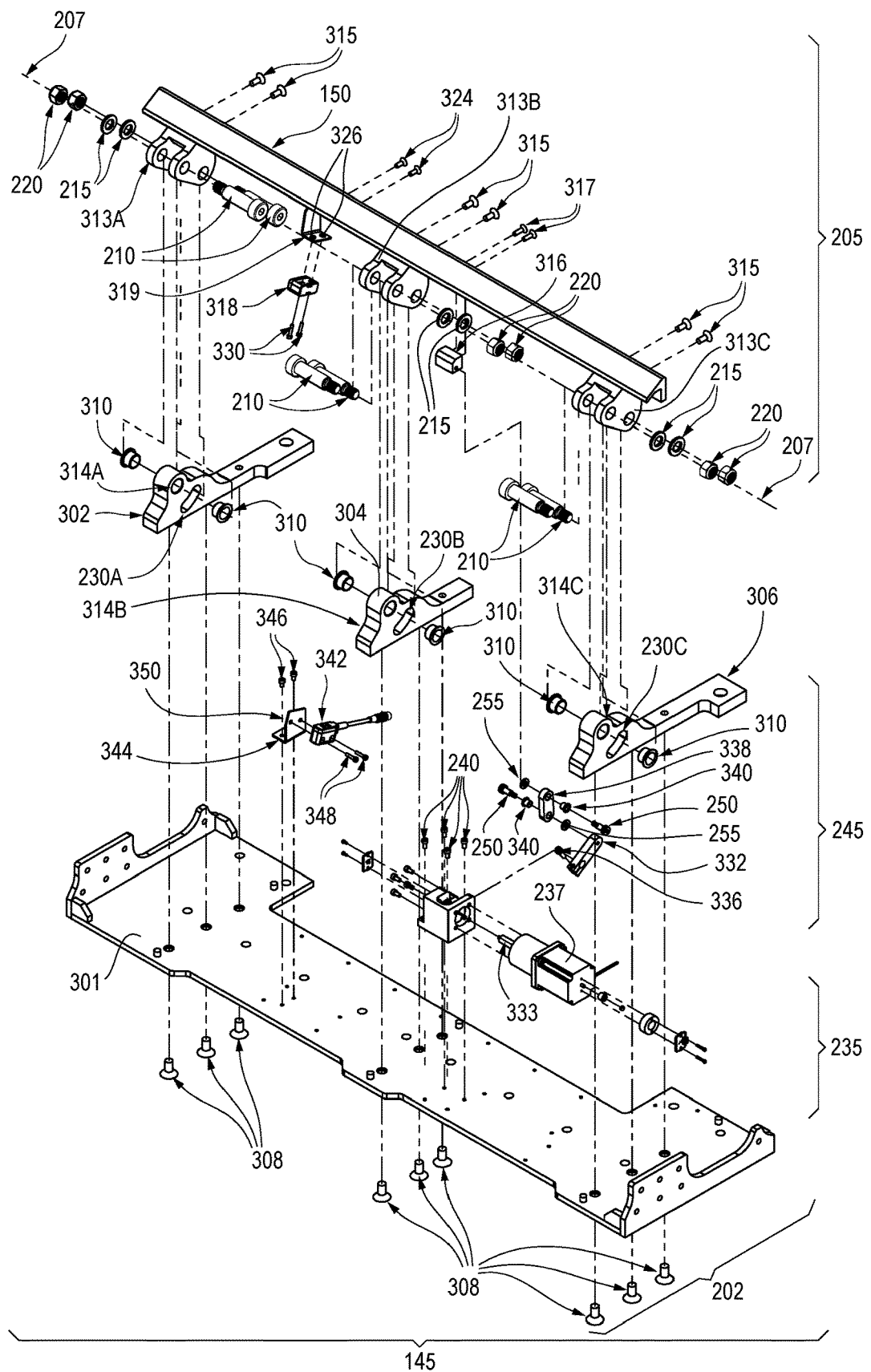
FIG. 3A is an exploded view depicting individual components of a payload stopper for a mobile robot.

FIG. 3A is an exploded drawing showing components of a payload stopper 145 for a mobile robot (not shown in this figure). An aspect of the invention and of the operation of the payload stopper 145 is the method by which the stopper blade assembly 205 is actuated between the upwardly rotated or engaged position (position 505 in FIG. 5 below) and a downwardly rotated or disengaged position (position 510 in FIG. 5 below). The interface assembly 202 comprises the interface weldment 301. The interface weldment 301 attaches the payload stopper 145 to the mobile robot (not shown in this figure). The payload stopper 145 again comprises the interface assembly 202 that serves as a main structural member of the payload stopper 145.

The interface assembly 202 further comprises a plurality of stopper ribs 302, 304, 306. The stopper ribs 302, 304, 306 structurally connect the stopper blade assembly 205 to the interface assembly 202. The stopper ribs 302, 304, 306 serve a purpose of transferring an impact of one or more of the pallet 120 and the payload 125 from the stopper blade 150 through the stopper shoulder screws 210 to the interface assembly 202. As depicted, the interface assembly 202 further comprises a left stopper rib 302, a middle stopper rib 304, and a right stopper rib 306. One or more of the left stopper rib 302, the middle stopper rib 304, and the right stopper rib 306 attach to the interface weldment 301 using a plurality of rib fasteners 308. A plurality of pivot bushings 310 are press-fit into each of the left stopper rib 302, the middle stopper rib 304, and the right stopper rib 306. As depicted, two pivot bushings 310 are press-fit into each of the left stopper rib 302, the middle stopper rib 304, and the right stopper rib 306.

The stopper blade assembly 205 comprises the stopper blade 150 that runs along the width of the rollers (not shown in this figure). The stopper blade 150 regulates movement of the payload (not shown in this figure). The stopper blade assembly 205 further comprises a left pivot arm 313A, a middle pivot arm 313B, and a right pivot arm 313C. The pivot arms 313A-313C attaches to the interface assembly 202 so as to allow the stopper blade assembly 205 to pivot about the axis 207.

At least one pivot arm 313A-313C is attached to at least one stopper rib 302. Preferably, but not necessarily, each pivot arm 313A-313C is attached to each stopper rib 302. The stopper shoulder screws 210, the stopper washers 215, and the stopper lock-nuts 220 fasten the left pivot arm 313A to the left stopper rib 302 through a left pivot point 314A and a left curved slot 230A. Similarly, the stopper shoulder screws 210, the stopper washers 215, and the stopper lock-nuts 220 fasten the middle pivot arm 313B to the middle stopper rib 304 through a middle pivot point 314B and a middle curved slot 230B. In a like manner, the stopper shoulder screws 210, the stopper washers 215, and the stopper lock-nuts 220 fasten the right pivot arm 313C to the right stopper rib 306 through a right pivot point 314C and a right curved slot 230C. A purpose of the stopper washers 215 is to distribute the pressure of the stopper lock-nuts 220 over the surface of each pivot arm 313A-313C and to minimize loosening of the stopper lock-nuts 220 over time. During a braking scenario when the payload impacts the payload stopper 145, these stopper shoulder screws 210 are used to transfer the load from where the payload contacts the stopper blade 150 through the three pivot arms 313A-313C to the interface weldment 301.

The pivot arms 313A-313C are attached to the stopper blade 150 using a plurality of pivot arm fasteners 315. The stopper blade assembly 205 further comprises a linkage mount 316 attached to the stopper blade 150. The linkage mount 316 attaches to the stopper blade 150 using a plurality of linkage mount fasteners 317. The stopper blade assembly 205 further comprises a transmitting safety switch 318. For example, the transmitting safety switch 318 comprises a non-contact safety switch actuator, manufactured by Sick of Waldkirch, Germany (www.sick.com). The transmitting safety switch 318 is held in place by a transmitting safety switch holder 319. Since the transmitting safety switch holder 319 is also attached to the stopper blade 150, the transmitting safety switch holder 319 causes the transmitting safety switch 318 to move with the stopper blade 150 when the transmitting safety switch holder 319 is actuated up or down. The transmitting safety switch holder 319 is attached to the stopper blade 150 using a plurality of transmitter holder fasteners 324. Pressed into the transmitting safety switch holder 319 are a plurality of transmitter threaded inserts 326. The transmitter threaded inserts 326 are attached to the transmitting safety switch holder 319 by press-fitting. The transmitter threaded inserts 326 use a plurality of transmitter fasteners 330 to mate the transmitting safety switch holder 319 with the transmitting safety switch 318.

The linkage 245 comprises a crank link 332 that on one end is attached to the output shaft 333 of motor 237 with a crank fastener 336 and on the other end is attached to a rocker link 338. The crank link 332 mates to the rocker link 338 with the use of a linkage shoulder screw 250, linkage washer 255 and a linkage bushing 340 inserted into the rocker link 338. For example, the linkage bushing 340 comprises a sleeve bearing with flange, manufactured by Igus of Cologne, Germany (www.igus.com). The linkage bushing 340, linkage shoulder screws 250, and linkage washer 255 ensure smooth articulation of the linkage by reducing friction between contact surfaces. The other end of the rocker link 338 attaches to the stopper blade assembly 205 through the linkage mount 316 with a linkage shoulder screw 250, linkage washer 255 and a linkage bushing 340 that is inserted into the rocker link 338. The purpose of the linkage mount 316 is to attach the rocker link 338 to the stopper blade assembly 205. The purpose of the crank link 332 and the rocker link 338 is to actuate the stopper blade assembly 205 between the engaged position 505 and the disengaged position 510 by converting rotational output of the motor 237 into rotation of the stopper blade assembly 205. For example, the motor 237 comprises a gear motor, manufactured by Source Engineering, Inc. of Santa Clara, Calif. (www.sei-automation.com). Thus the purpose of the motor 237 is to provide an initial source of actuation by converting electrical energy to rotational (mechanical) energy.

The payload stopper 145 further comprises a receiving safety switch 342. The position of the stopper blade assembly 205 relative to the interface weldment 301 is detected through the use of the transmitting safety switch 318 in combination with the receiving safety switch 342. For example, the receiving safety switch 342 comprises a non-contact safety switch sensor manufactured by Sick of Waldkirch, Germany (www.sick.com). The receiving safety switch 342 is mounted to the interface weldment 301 using a receiving safety switch holder 344, receiver holder fasteners 346 and receiver fasteners 348 that thread into the receiver threaded inserts 350 of the receiving safety switch holder 344. The receiving safety switch 342 interfaces electrically with a safety system controller (not shown in this figure) on the mobile robot (not shown in this figure) to ensure that the mobile robot (not shown in this figure) will only be able to drive when the stopper blade assembly 205 is rotated into the engaged position (not shown in this figure). As shown in more detail in FIGS. 9A-9B below, the receiving safety switch 342 and transmitting safety switch 318 are mounted relative to each other such that the receiving safety switch 342 will only transmit a signal to a safety controller if the stopper blade assembly 205 is rotated into the engaged position (not shown in this figure). This ensures that the mobile robot payload transport system 100 maintains control of the pallet 120 and payload 125 when the mobile robot payload transport system 100 is navigating in a customer's facility.

Figure 3B:
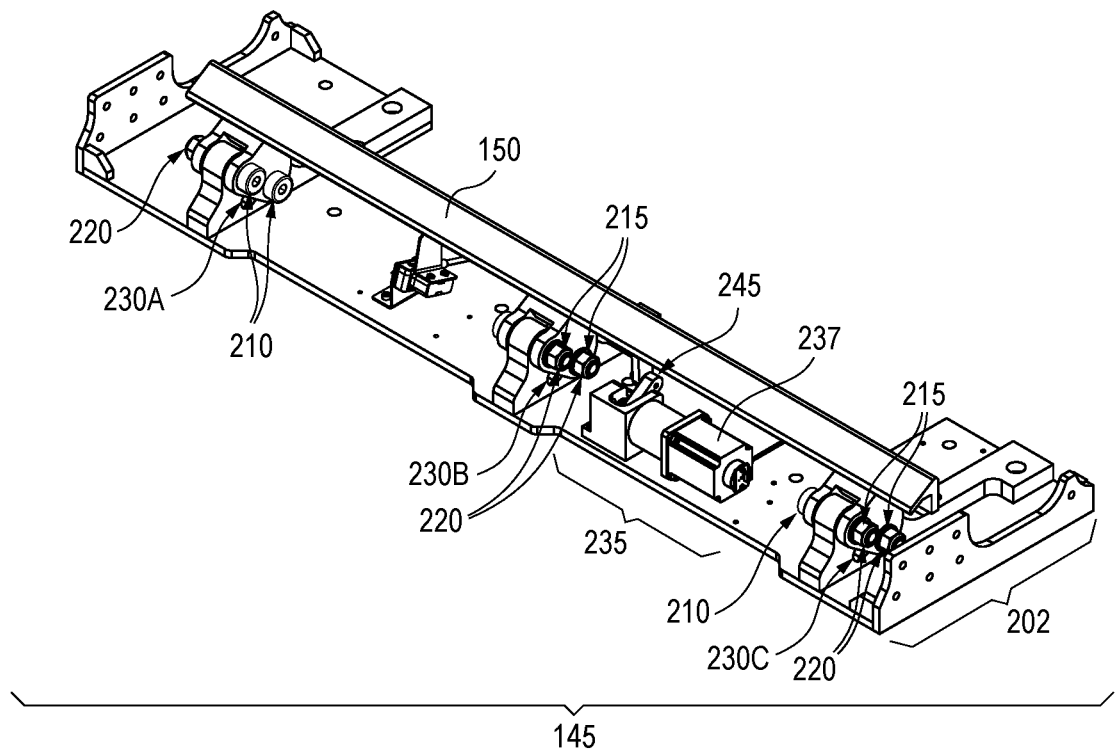
FIG. 3B is a drawing of a fully assembled payload stopper for a mobile robot.

FIG. 3B is a drawing of a fully assembled payload stopper 145 for a mobile robot (not shown in this figure). The payload stopper 145 comprises the stopper blade 150, the interface assembly 202, the stopper shoulder screws 210, the stopper washers 215 (not visible in the upper part of the figure but visible in the middle and lower part of the figure), the stopper lock-nuts 220 the three slots 230A, 230B, and 230C, and the motor assembly 235, and the linkage 245.

Figure 4:
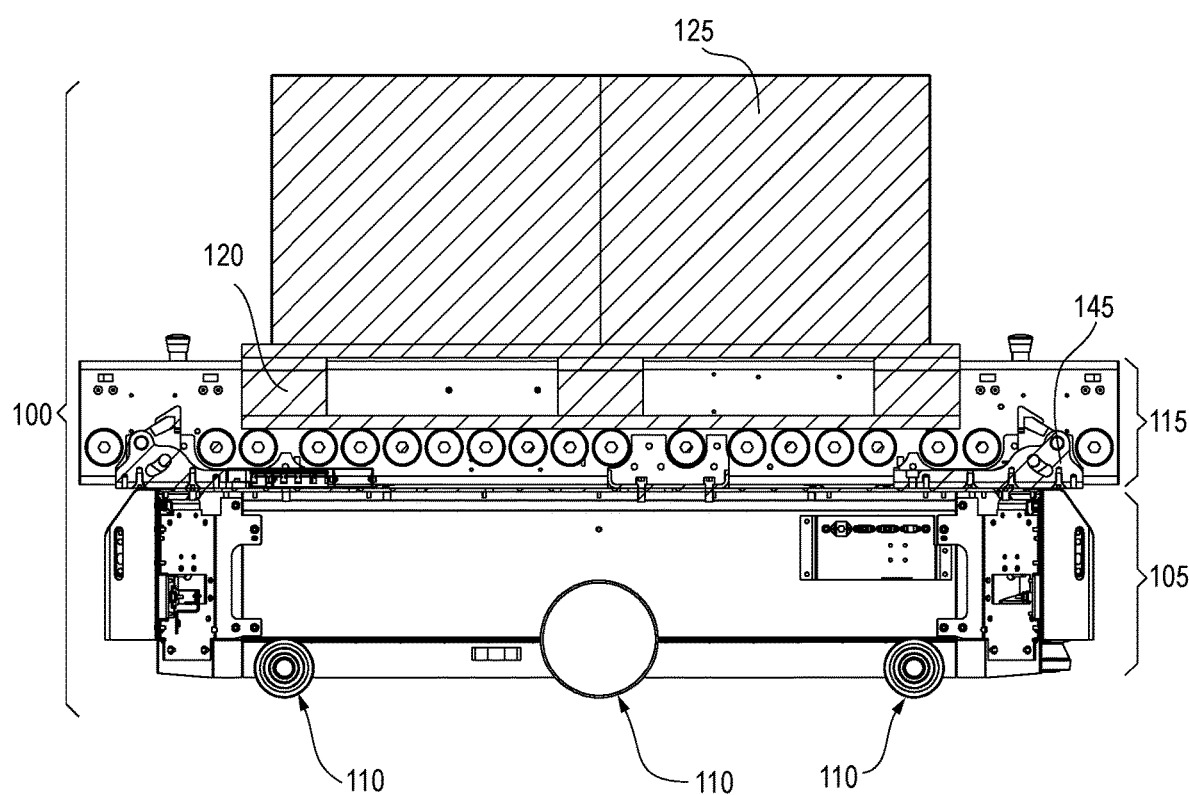
FIG. 4 is a drawing in cross-section view of a payload transport system comprising a payload stopper for a mobile robot.

FIG. 4 is a drawing in cross-section view of a payload transport system 100 comprising a payload stopper 145 for a mobile robot 105.

The payload transport system 100 again comprises a mobile robot 105, the mobile robot 105 again comprising wheels 110. The mobile robot payload transport system 100 again further comprises a conveyor 115 that is attached to the mobile robot 105. The conveyor 115 again comprises a pallet 120. The pallet 120 again comprises a payload 125. The conveyor 115 again further comprises a payload stopper 145 configured to stop the pallet 120 from moving off the conveyor 115, thereby preventing the payload 125 from moving off the conveyor 115.

Figure 5A:
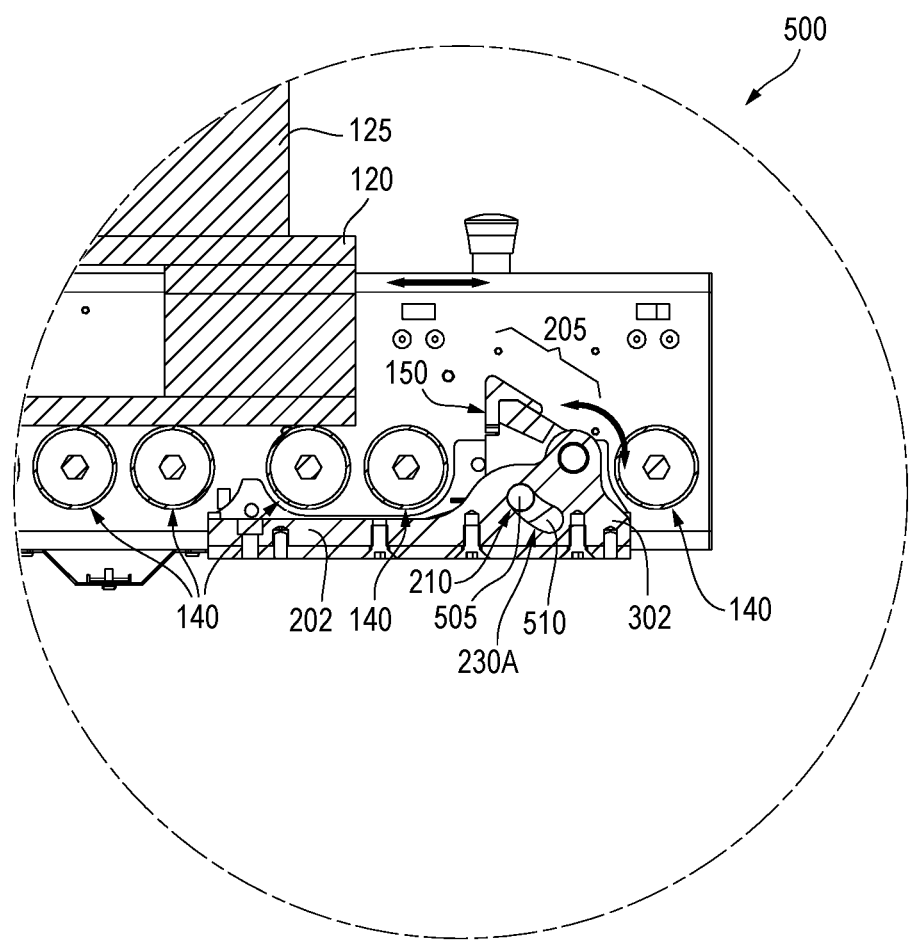
FIG. 5A is a cross-section detail view showing a stopper blade assembly of a payload stopper in an engaged position to stop the payload from moving.

FIG. 5A is a cross-section detail view 500 of a stopper blade assembly 205 of a payload stopper (not shown in this figure) for a mobile robot (not shown in this figure) in an engaged position 505 to stop the pallet 120 from moving to the right. Also shown are the rollers 140 and the interface assembly 202. When the stopper blade assembly 205 is in the engaged position 505, the stopper shoulder screws 210 that sit at a top of the slot 230A (and sit at tops of slots 230B and 230C, not visible in this figure) prevent the stopper blade assembly 205 from continuing to rotate when the pallet 120 impacts the stopper blade 150. Thus each of the left stopper rib 302, middle stopper rib 304, and right stopper rib 306 serve the purpose of absorbing the load from the pallet 120 impacting the stopper blade assembly 205. The motor assembly (not shown in this figure) does not absorb the impact of the pallet 120 comprising the payload 125, enabling the motor assembly (not shown in this figure) to fulfill its function of actuating the stopper blade assembly 205 between the engaged position 505 and the disengaged position 510.

FIG. 5B is a cross-section detail view 550 of a stopper blade assembly 205 of a payload stopper (not shown in this figure) for a mobile robot (not shown in this figure) in the disengaged position 510 in order to allow the payload 125 to be one or more of one or more of unloaded off the pallet 120 in a controlled unloading operation and loaded onto the pallet 120.

Height window 555 comprises a distance between a bottom face 560 of the interface assembly 202 and a top face 570 of the rollers 140. When in the disengaged position 510, the payload stopper 145, or more specifically, the stopper blade assembly 205 of the payload stopper 145, fits within dimension 555. As depicted, the height window 555 equals approximately four inches. With the stopper blade assembly 205 below the top of the rollers 140, when the pallet transport system (not shown) is stationary, the pallet 120 and thus the payload 125 are allowed to be one or more of unloaded off the pallet 120 in a controlled unloading operation and loaded onto the pallet 120. For example, during the one or more of loading and unloading, the pallet 120 moves over the payload stopper 145, with the payload stopper 145 supporting the payload 120 as it passes over the payload stopper 145. For example, the payload stopper 145 acts as a skid plate for the payload 120 as it passed over the payload stopper 145.

Figure 5C:
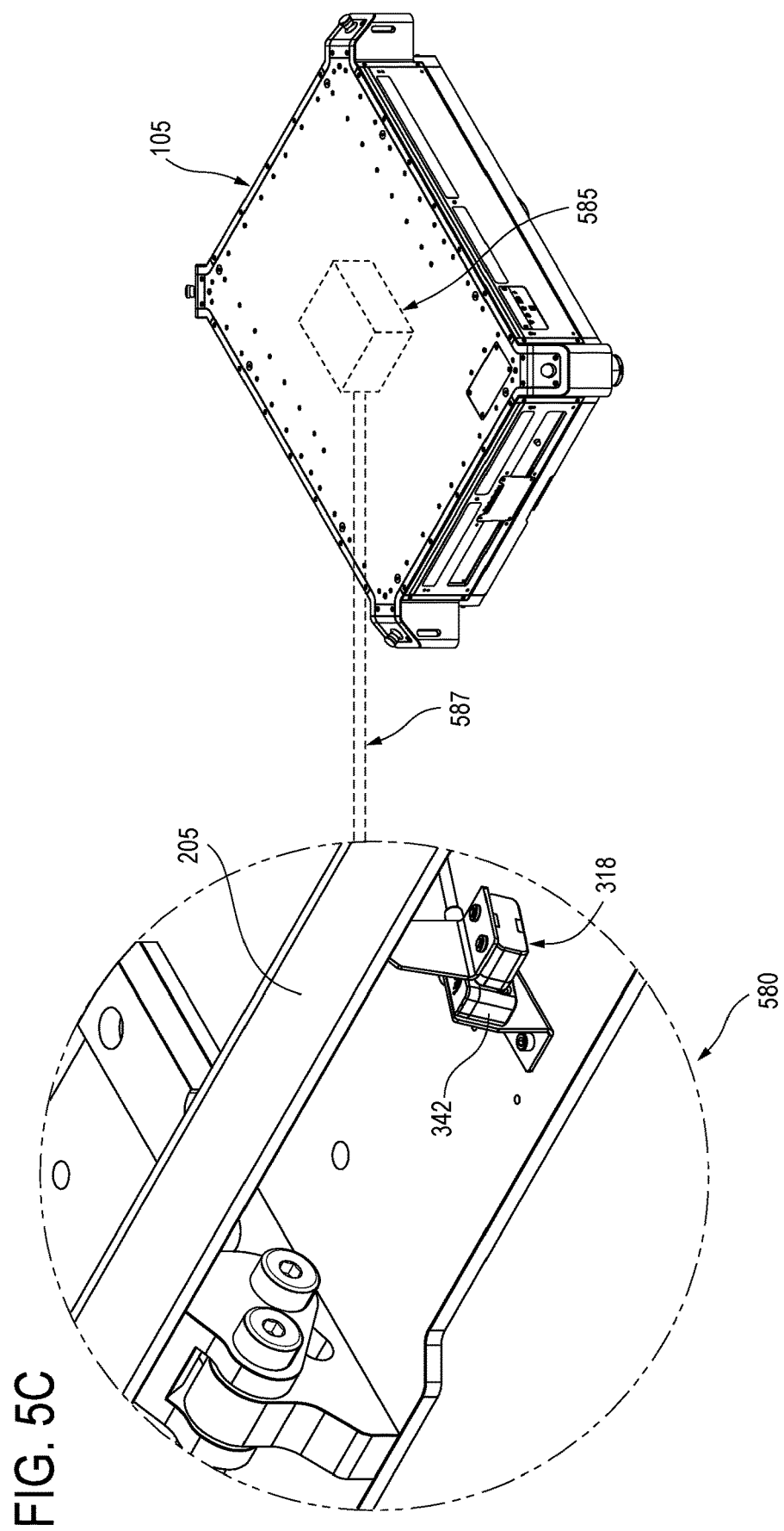
FIG. 5C is a detail view of the payload stopper for a mobile robot showing an aligned orientation of the receiving safety switch relative to the transmitting safety switch when the stopper blade assembly is in the engaged position.

FIG. 5C is a detail view 580 of the payload stopper (not shown in full in this figure) for the mobile robot 105 showing an aligned orientation of the receiving safety switch 342 relative to the transmitting safety switch 318 when the stopper blade assembly 205 is in the engaged position (as shown in FIG. 5A). The mobile robot 105 comprises a safety system controller 585. For example, the safety system controller 585 comprises electronics controlling actuation of the stopper blade assembly (not shown in this figure). The alignment of the receiving safety switch 342 and the transmitting safety switch 318 in the engaged position (as shown in FIG. 5A) results in generation of a signal from the receiving safety switch 342 over wire 587 to the safety system controller 585. The signal indicates that the robot 105 is safe to move.

Figure 5D:
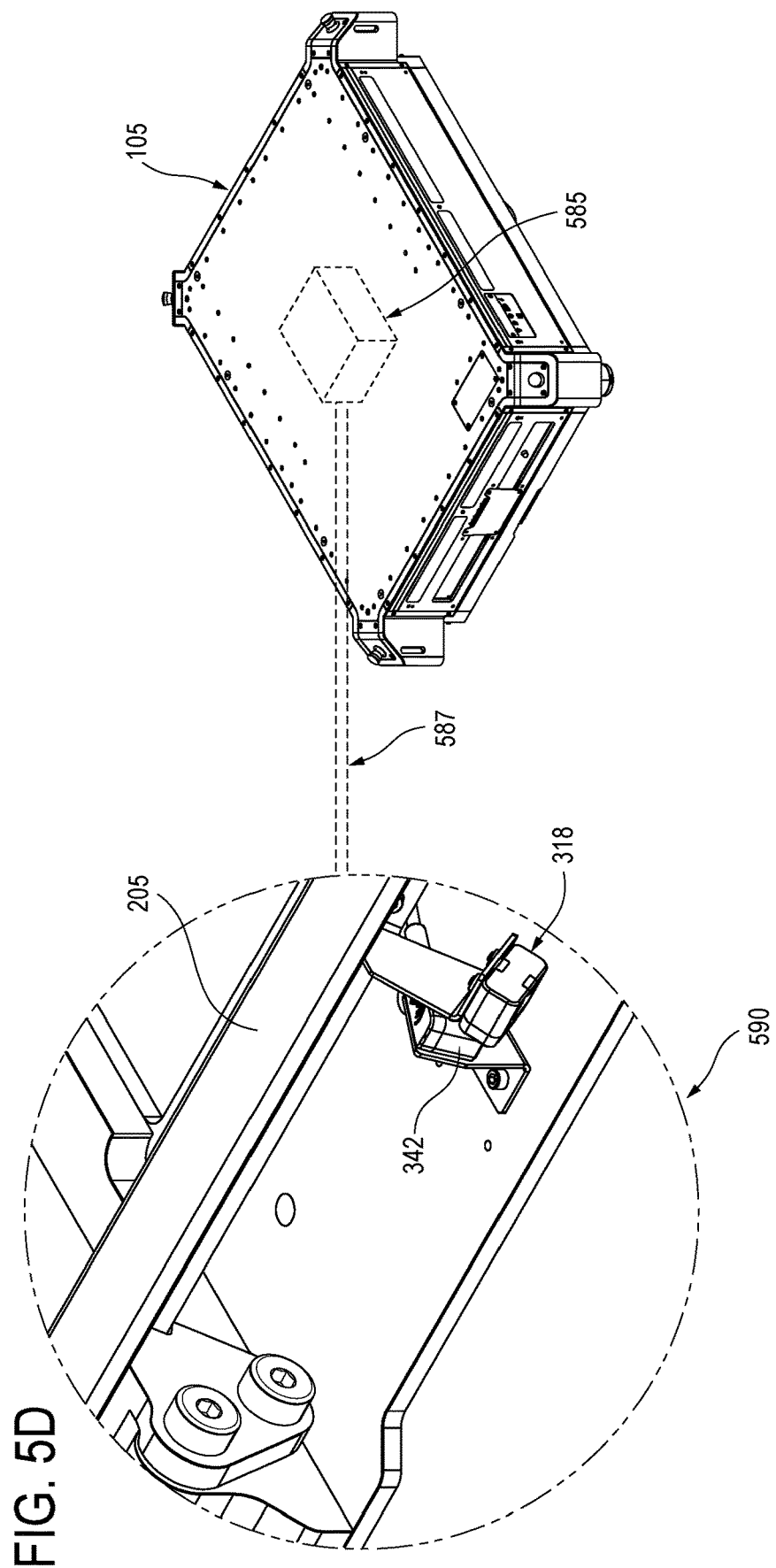
FIG. 5D is a detail view of the payload stopper for a mobile robot showing the orientation of the receiving safety switch relative to the transmitting safety switch when the stopper blade assembly is in the disengaged position.

FIG. 5D is a detail view 590 of the payload stopper (not shown in full in this figure) for the mobile robot 105 showing a non-aligned orientation of the receiving safety switch 342 relative to the transmitting safety switch 318 when the stopper blade assembly 205 is in the disengaged position (as shown in FIG. 5B). The non-alignment of the receiving safety switch 342 and the transmitting safety switch 318 in the disengaged position (as shown in FIG. 5B) results in non-generation of a signal over the wire 587 to the safety controller 585. This enables a known-truth signaling in that the robot 105 can be instructed not to move if it does not receive an appropriate signal over the wire 587 from the receiving safety switch 342.

Figure 6:
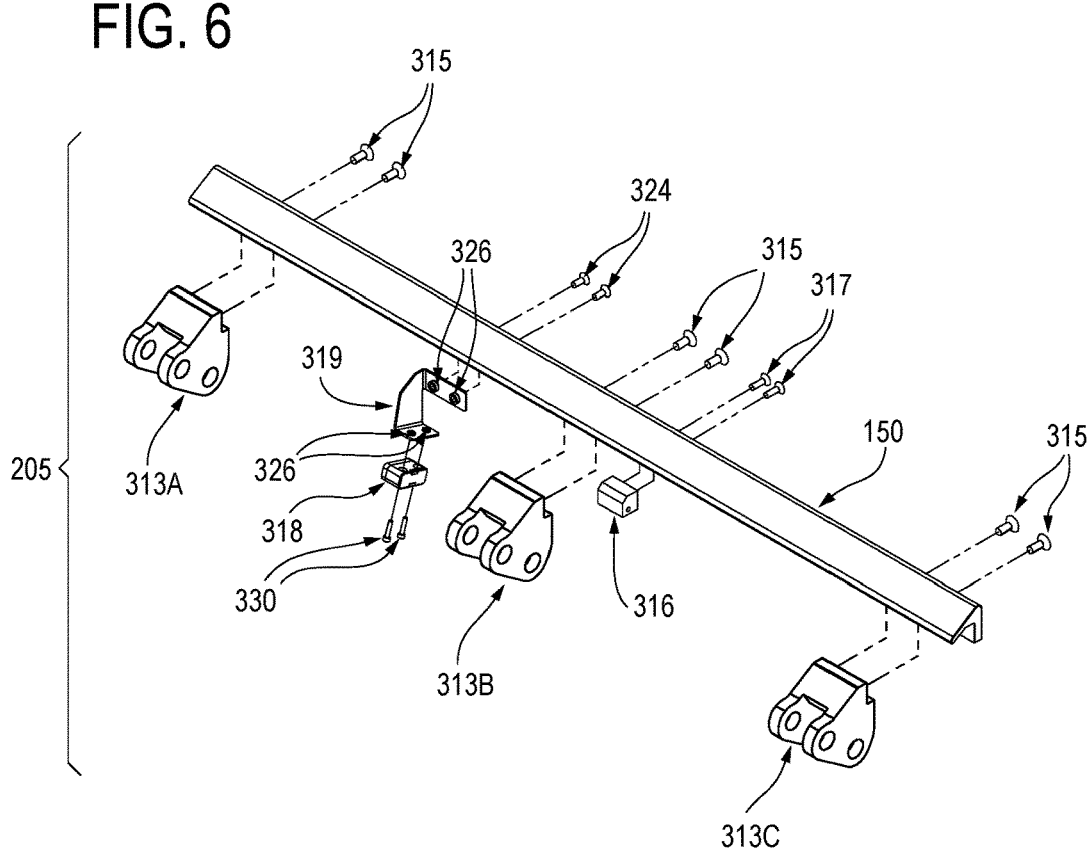
FIG. 6 is an exploded view of a stopper blade assembly of a payload stopper for a mobile robot.

FIG. 6 is an exploded view of the stopper blade assembly 205 of a payload stopper (not shown in this figure) for a mobile robot (not shown in this figure).

The stopper blade assembly 205 again comprises the stopper blade 150 that runs along the width of the rollers (not shown in this figure), the pivot arms 313A-313C, the pivot arm fasteners 315, the linkage mount 316, the linkage mount fasteners 317, the transmitting safety switch 318, the transmitting safety switch holder 319, the transmitter holder fasteners 324, the transmitter threaded inserts 326, and the transmitter fasteners 330. The purpose of the stopper blade 150 is to contact the side of the pallet (not shown in this figure) when the stopper blade assembly 205 is rotated in the engaged position (not shown in this figure). The stopper blade assembly 205 stops the pallet (not shown in this figure) when the stopper blade assembly 205 is rotated into the engaged position (not shown in this figure) and allows the pallet (not shown in this figure) to pass when the stopper blade assembly 205 is rotated into the disengaged position (not shown in this figure).

Figure 7:
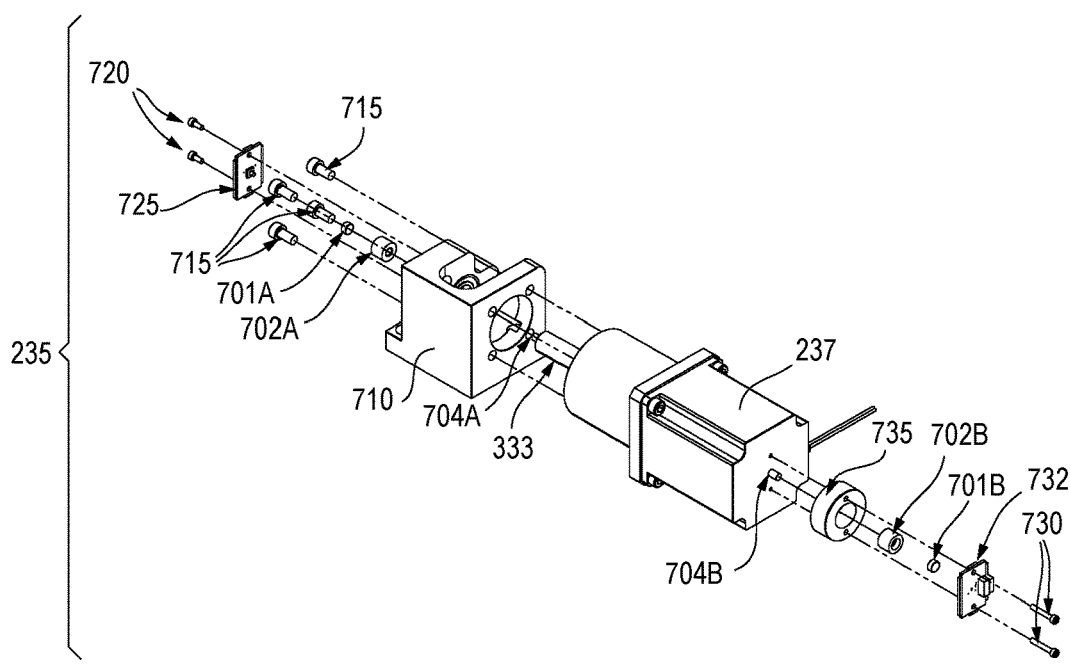
FIG. 7 is an exploded view of a motor assembly of the payload stopper for a mobile robot.

FIG. 7 is an exploded view of a motor assembly 235 of a payload stopper (not shown in this figure) for a mobile robot (not shown in this figure). Output and input magnets 701A and 701B are respectively fastened to output and input magnet holders 702 A and 702B. Output and input magnet holders 702A and 702B are respectively bonded to output and input shafts 704A and 704B on each end of the motor 237. The motor 237 mounts to a motor holder 710 with motor fasteners 715. The motor holder 710 attaches the motor 237 to the interface weldment 301. The motor holder 710 supports the output shaft 333 of the motor 237, providing a second support so that the output shaft 333 is not cantilevered. Output encoder fasteners 720 attach an output encoder board 725 to the motor holder 710. Input encoder fasteners 730 affix an input encoder board 732 to a backside of the motor 237 through the use of an encoder holder 735 as a spacer. When the motor 237 spins, the output magnet 701A and the input magnet 701B spin. The output encoder board 725 reads a position of the output magnet 701A. The input encoder board 732 reads a position of the input magnet 701B. The output encoder board 725 and the input encoder board 732 use the respective positions of the output magnet 701A and of the input magnet 701B to control a position of the motor 237 and to thereby control a position of the stopper blade assembly 205.

Figure 8:
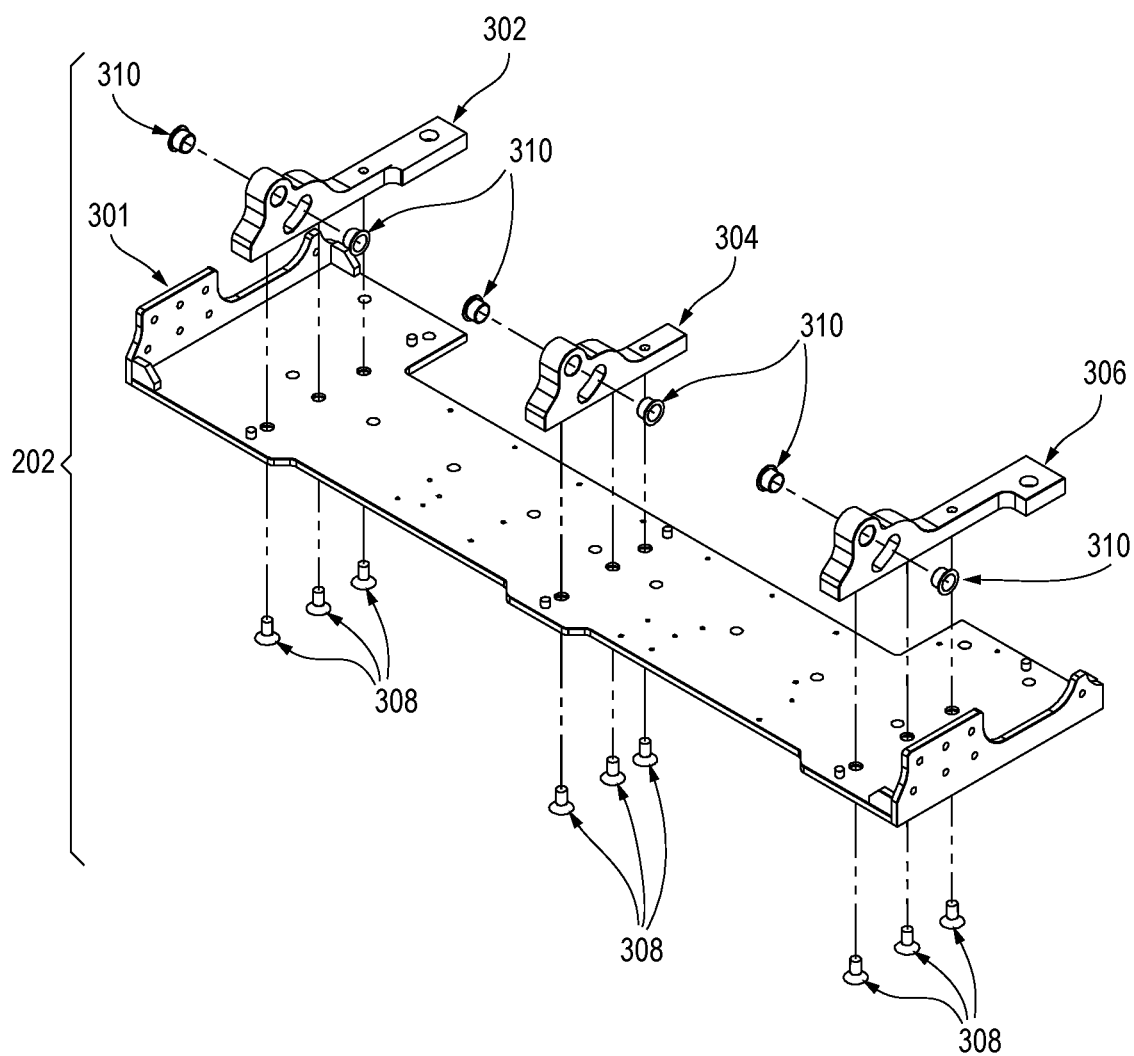
FIG. 8 is an exploded view of the interface assembly of the payload stopper for a mobile robot.

FIG. 8 is an exploded view of the interface assembly 202 of a payload stopper (not shown in this figure) for a mobile robot (not shown in this figure). The interface assembly 202 again comprises the left stopper rib 302, the middle stopper rib 304, the right stopper rib 306, the rib fasteners 308, and the pivot bushings 310. For example, the pivot bushing 310 comprises a sleeve bearing with flange, manufactured by igus of Cologne, Germany (www.igus.com).

Advantages of the invention include the ability of embodiments of the invention to ensure that very heavy payloads can be retained on top of the moving robot. In case the mobile robot is not in motion, safety is increased by having a mechanism which is able to sense its own state (either a safe engaged position or an unsafe disengaged position), and communicate to the other mobile robots whether it is safe for the robot to move. Another advantage is the ability of embodiments of the invention to handle a high impact force produced from the inertia of the payload when a mobile robot brakes suddenly. Another advantage is permitting higher speeds of the mobile robot due to the enhanced safety. For example, the speeds range between approximately 1 meter per second to approximately 2 meters per second. Another advantage is that payloads are thereby maintained in better condition. A further advantage of embodiments of the invention is that they allow for faster deceleration than a coefficient of friction between the rollers and the payload would allow on its own.

Another advantage of embodiments of the invention is that they allow for a payload to be transported from a mobile robot onto other equipment without interference. A still further advantage of embodiments of the invention is that the payload stopper provides to users working in the same areas as the mobile robot a visual signal of a workflow state of the robot. For example, if the payload stoppers are in the downward or disengaged position, one can tell that the robot will not move (and likely is either waiting to be loaded or is ready to transfer a payload).

Another advantage of embodiments of the invention is that the compact design allows for the robot to be positioned as closely as possible to an existing conveyor. A still further advantage of embodiments of the invention is that during payload transfer, this mechanism also acts as a skid plate for the payload, supporting the payload as it passes over the mechanism.

Another advantage of embodiments of the invention is that the way the stopper is attached to the robot chassis transfers the load from the components of the payload stopper to the robot base. Another advantage is that the stress point is not on the motor that moves the mechanism but on the base itself.

Advantages of the payload stopper for a mobile robot include preventing a payload from sliding on a mobile robot conveyor and falling off when the mobile robot comes to an abrupt stop. A further advantage of the payload stopper for a mobile robot is its ability to handle heavy payloads of up to approximately 3,000 pounds. A still further advantage of the payload stopper for a mobile robot is its ability to prevent an uncontrolled discharge of a payload of up to approximately 3,000 pounds. A yet further advantage of the payload stopper for a mobile robot is the invention's prevention of one or more of bodily injury and fatality even in scenarios when the mobile robot itself is able to sufficiently come to a stop.

Another advantage of the payload stopper for a mobile robot is that it is both robust enough to handle the high impact forces involved in stopping a heavy payload while also being compact enough to fold down and out of the way when the payload is conveyed across the mobile robot conveyor. For example, the high impact forces range between approximately 20 kiloNewtons (kN) and 40 kN. Another advantage is that the payload stopper is compact enough, when in the disengaged position, to fit in an approximately 4-inch height window to allow payloads to be conveyed across the mobile robot's conveyor during one or more of on-loading and off-loading.

The payload stopper for a mobile robot includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

For example, it will be understood by those skilled in the art that software used by the payload stopper for a mobile robot may be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components.

For example, it will be understood by one of ordinary skill in the art that the order of certain steps and certain components can be altered without substantially impairing the functioning of the invention. For example, the motor moves in a way not involving rotation. For example, the function of the motor is instead performed by an actuator. For example, the actuator moves in a way not involving rotation. For example, one or more of the motor and the actuator comprises one or more of a pneumatic piston and a hydraulic piston. In these cases, the linkage converts the non-rotational output of the motor into movement of the stopper blade assembly.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A compact payload stopper configured to stop a payload from moving from a position on a conveyor on a mobile robot, comprising:
    an interface assembly that serves as a main structural member of the payload stopper, the interface assembly attaching the payload stopper to the mobile robot, the payload stopper configured to stop the payload from moving off the mobile robot;
    a stopper blade assembly connected to the interface assembly so as to allow the stopper blade assembly to pivot about an axis of the interface assembly, the stopper blade assembly comprising a stopper blade configured to regulate movement of the payload, the stopper blade assembly configured to have a disengaged position that allows for one or more of moving a payload onto the robot and moving a payload off the robot, the stopper blade assembly further configured to have an engaged position that stops the payload from moving off the robot; and
    a motor assembly comprising a motor, the motor assembly connected to the interface assembly, the motor assembly configured to apply a force to the stopper blade assembly, causing the stopper blade assembly to rotate into a desired position of the engaged position and the disengaged position.

2. The payload stopper of claim 1, wherein the payload stopper is installed on one or more of a front side and a back side of the robot.

3. The payload stopper of claim 1, wherein the engaged position prevents the payload from falling off the robot during braking.

4. The payload stopper of claim 1, wherein the engaged position prevents unloading of the payload from the robot by the conveyor.

5. The payload stopper of claim 1, wherein the disengaged position folds the stopper blade assembly down beneath the height of the conveyor.

6. The payload stopper of claim 5, wherein when the payload transport system is stationary, the conveyor can cause the payload to be one or more of unloaded from the robot and loaded onto the robot.

7. The payload stopper of claim 1, wherein the payload stopper is configured to provide feedback as to whether it is safe for the robot to move.

8. The payload stopper of claim 7, wherein the payload stopper provides the feedback to one or more of a safety system of the robot and electronics controlling actuation of the stopper blade assembly.

9. The payload stopper of claim 7, wherein the feedback that it is safe for the robot to move is provided when the payload stopper is in the engaged position.

10. The payload stopper of claim 7, wherein the feedback that it is not safe for the robot to move is provided when the payload stopper is in the disengaged position.

11. The payload stopper of claim 1, wherein when the stopper blade assembly is in the engaged position, a receiving safety switch and a transmitting safety switch are aligned.

12. The payload stopper of claim 11, wherein the alignment of the receiving safety switch and the transmitting safety switch results in sending of a signal to the safety controller.

13. The payload stopper of claim 1, wherein when the stopper blade assembly is in the disengaged position, the receiving safety switch and the transmitting safety switch are not aligned.

14. The payload stopper of claim 13, wherein the non-alignment of the receiving safety switch and the transmitting safety switch results in no signal to the safety controller.

15. The payload stopper of claim 1, the payload stopper further comprising a linkage configured to actuate the stopper blade assembly between the engaged position and the disengaged position by converting rotational output of the motor into rotation of the stopper blade assembly.

16. The payload stopper of claim 15, wherein the motor assembly is configured to apply the force to the stopper blade assembly through the linkage.

17. The payload stopper of claim 16, the stopper blade assembly further comprising a plurality of stopper shoulder screws configured to fasten the stopper blade assembly through a plurality of slots in the interface assembly.

18. The payload stopper of claim 17, wherein when the stopper blade assembly is rotated into the engaged position, the stopper shoulder screws are held at a top of the slots.

19. The payload stopper of claim 18, wherein the stopper shoulder screws resist rotation of the stopper blade assembly when the payload impacts the stopper blade.

20. The payload stopper of claim 1, wherein the interface assembly comprises an interface weldment.

21. The payload stopper of claim 20, wherein the interface weldment comprises a plurality of stopper ribs.

22. The payload stopper of claim 21, wherein during braking, when the payload impacts the payload stopper, the stopper shoulder screws are configured to transfer an impact of the payload from the stopper blade through the three pivot arms to the stopper ribs.

23. The payload stopper of claim 1, wherein the stopper blade assembly comprises a plurality of pivot arms.

24. The payload stopper of claim 23, wherein the pivot arms attach to the interface assembly.

25. The payload stopper of claim 24, wherein the pivot arms attach to the interface assembly so as to allow the stopper blade assembly to pivot about the axis.

26. The payload stopper of claim 25, wherein at least one pivot arm is attached to at least one stopper rib.

27. The payload stopper of claim 26, wherein each pivot arm is attached to each stopper rib.

28. The payload stopper of claim 1, wherein the payload stopper, when in the disengaged position, fits in an approximately 4-inch height window.

29. The payload stopper of claim 1, wherein, during payload transfer, the payload stopper is configured to act as a skid plate for the payload, supporting the payload as it passes over the stopper.

30. The payload stopper of claim 1, wherein the payload stopper is configured to handle a payload weighing of up to approximately 3,000 pounds.

31. The payload stopper of claim 1, wherein the payload stopper is configured to handle payload impacts between approximately 20 kiloNewtons (kN) and 40 kN.

32. The payload stopper of claim 1, wherein the payload stopper is configured to handle robot speeds between approximately 1 meter per second and approximately 2 meters per second.

33. The payload stopper of claim 1, wherein the payload stopper is further configured to stop a pallet from moving off the mobile robot, the pallet comprising the payload.

34. A compact payload stopper configured to stop a payload from moving from a position on a conveyor on a mobile robot, comprising:
- an interface assembly that serves as a main structural member of the payload stopper, the interface assembly attaching the payload stopper to the mobile robot, the payload stopper configured to stop the payload from moving off the mobile robot;
- a stopper blade assembly connected to the interface assembly so as to allow the stopper blade assembly to pivot about an axis of the interface assembly, the stopper blade assembly configured to have a disengaged position that allows for one or more of moving a payload onto the robot and moving a payload off the robot, the stopper blade assembly further configured to have an engaged position that stops the payload from moving off the robot, the stopper blade assembly further comprising a plurality of stopper shoulder screws configured to fasten the stopper blade assembly through a plurality of slots in the interface assembly, the stopper shoulder screws configured to resist rotation of the stopper blade assembly when the payload impacts the stopper blade;
- a linkage configured to actuate the stopper blade assembly between the engaged position and the disengaged position by converting rotational output of the motor into rotation of the stopper blade assembly; and
- a motor assembly comprising a motor, the motor assembly connected to the interface assembly, the motor assembly configured to apply a force through the linkage to the stopper blade assembly, causing the stopper blade assembly to rotate into a desired position of the engaged position and the disengaged position.

35. A compact payload stopper configured to stop a payload from moving from a position on a conveyor on a mobile robot, comprising:
- an interface assembly that serves as a main structural member of the payload stopper, the interface assembly attaching the payload stopper to the mobile robot, the payload stopper configured to stop the payload from moving off the mobile robot;
- a stopper blade assembly connected to the interface assembly so as to allow the stopper blade assembly to pivot about an axis of the interface assembly, the stopper blade assembly configured to have a disengaged position that allows for one or more of moving a payload onto the robot and moving a payload off the robot; wherein the disengaged position folds the stopper blade assembly down beneath the height of the conveyor, the stopper blade assembly further configured to have an engaged position that stops the payload from moving off the robot, wherein the payload stopper is configured to provide feedback when the payload stopper is in the engaged position that it is safe for the robot to move, wherein the payload stopper is further configured to provide feedback when it is in the disengaged position that it is not safe to move;
- a linkage configured to actuate the stopper blade assembly between the engaged position and the disengaged position by converting rotational output of the motor into rotation of the stopper blade assembly; and
- a motor assembly comprising a motor, the motor assembly connected to the interface assembly, the motor assembly configured to apply a force through the linkage to the stopper blade assembly, causing the stopper blade assembly to rotate into a desired position of the engaged position and the disengaged position, wherein the payload stopper is installed on one or more of a front side and a back side of the robot.

* * * * *